United States Patent [19]
Takahashi

[11] Patent Number: 5,988,886
[45] Date of Patent: Nov. 23, 1999

[54] CLOSED TYPE THRUST DYNAMIC PRESSURE BEARING WITH THROUGH HOLE

[75] Inventor: Takeshi Takahashi, Kashiba, Japan

[73] Assignee: Koyo Seiko Co., Ltd., Osaka, Japan

[21] Appl. No.: 09/056,609

[22] Filed: Apr. 8, 1998

[51] Int. Cl.[6] .................................................. F16C 32/06
[52] U.S. Cl. ...................... 384/107; 384/112; 384/123
[58] Field of Search .................... 384/107, 112, 384/121, 123

[56] References Cited

U.S. PATENT DOCUMENTS

| | | | |
|---|---|---|---|
| 5,407,281 | 4/1995 | Chen | 384/107 |
| 5,433,529 | 7/1995 | Hensel | 384/112 |
| 5,487,608 | 1/1996 | Leuthold et al. | 384/123 X |
| 5,516,212 | 5/1996 | Titcomb | 384/112 X |
| 5,536,088 | 7/1996 | Cheever et al. | 384/107 |
| 5,559,382 | 9/1996 | Oku et al. | 384/112 X |
| 5,658,080 | 8/1997 | Ichiyama | 384/112 |

*Primary Examiner*—Thomas R. Hannon
*Attorney, Agent, or Firm*—Wenderoth, Lind & Ponack, L.L.P.

[57] ABSTRACT

A closed type thrust dynamic pressure bearing is capable of generating enough dynamic pressure for axially bearing a rotating member at the time of start-up without damage to an end face of a flange of the rotating member. The flange of the rotating member is housed in a housing in a closed state. V-shaped dynamic pressure generating grooves are provided at upper and lower end faces of the flange, while a plurality of holes axially passing through the flange are provided radially inside an annular region where the dynamic pressure generating grooves are provided. The total sum of cross-sectional areas of the holes is at least 1/30 of the area of the annular region. Oil sumps are provided at a receiving surface of the housing opposite to the lower end face of the flange.

8 Claims, 2 Drawing Sheets ined. 5,988,886

CLOSED TYPE THRUST DYNAMIC PRESSURE BEARING WITH THROUGH HOLE

BACKGROUND OF THE INVENTION

The present invention relates to a closed type thrust dynamic pressure bearing.

There has been available hitherto a closed type thrust dynamic pressure bearing which comprises a rotating member consisting of a shaft body and a flange provided at one end of the shaft body, and a housing for housing the flange of the rotating member in a closed state, where dynamic pressure generating grooves are formed at both axial end faces of the flange.

In this conventional closed type thrust dynamic pressure bearing, when the rotating member is installed vertically, the rotating member lowers due to gravity before activation so that the lower end face of the flange and the receiving surface of the housing opposite to the lower end face of the flange are brought into a contact state or into a state that only an extremely thin membrane of working fluid is present therebetween. In this state, with the rotating member activated, for example, V-shaped dynamic pressure generating grooves try to pull in the working fluid toward a radial center of these grooves simultaneously in both axial end faces of the flange. However, because the housing has the flange housed therein in a closed state, a negative pressure is generated between the upper end face of the flange and the housing, making it impossible to introduce the working fluid sufficiently to a place, particularly a radially inner portion, between the receiving surface of the housing and the lower end face of the flange where only a small amount of working fluid is present originally. Therefore, at the time of activation of the rotating member, there will arise a state that the working fluid is insufficient between the lower end face of the flange and the receiving surface. As a result, enough dynamic pressure for bearing the flange cannot he generated, disabling the thrust dynamic pressure bearing from fulfilling the function as a thrust dynamic pressure bearing, and damaging the end face of the flange.

SUMMARY OF THE INVENTION

Therefore, an object of the present invention is to provide a closed type thrust dynamic pressure bearing which is capable of generating enough dynamic pressure for axially bearing the flange at a start-up of activation, without damage to the end face or the like.

In order to achieve the above object, the present invention provides a closed type thrust dynamic pressure bearing comprising: a rotating member which comprises a shaft body and a flange provided at an end of the shaft body; and a housing for housing the flange of the rotating member in a closed state, wherein dynamic pressure generating grooves are formed at an end face of the flange or at a receiving surface of the housing opposite to the end face, characterized in that the flange has at least one hole which passes axially through the flange and which is provided radially inside an annular region where the dynamic pressure generating grooves are provided.

According to the closed type thrust dynamic pressure bearing of the present invention, when the rotating member rotates in the state where the shaft body of the rotating member is vertical, the working fluid placed between the upper end face of the flange and the receiving surface of the housing passes through the holes passing through the flange so as to be supplied to between the lower end face of the flange and the receiving surface of the housing, so that enough working fluid can be supplied to the dynamic pressure generating grooves. Therefore, enough dynamic pressure to effect the axial bearing of the flange is generated, allowing the thrust dynamic pressure bearing to fulfill the function as a thrust dynamic pressure bearing, and eliminating the possibility of damage at the lower end face of the flange and the receiving surface of the housing opposite thereto.

In an embodiment, a total sum of cross-sectional areas of the hole or holes is at least $\frac{1}{30}$ of an area of the annular region.

In the closed type thrust dynamic pressure bearing of this embodiment, the total sum of cross-sectional areas of the holes is at least $\frac{1}{30}$ of the annular region, so that enough working fluid is supplied to the lower end face of the flange at a specified rotating speed, allowing enough dynamic pressure to be generated. This fact was verified by experiment.

In an embodiment, an oil sump is provided at the receiving surface of the housing or at the end face of the flange in such a way that the oil sump is at least partly opposed to or overlapped with the annular region.

According to the closed type thrust dynamic pressure bearing of this embodiment, because an oil sump is provided at the receiving surface of the housing or at the end face of the flange so that the oil sump is at least partly opposed to or overlapped with the annular region, the supply of the working fluid to the lower end face of the flange at the activation of the rotating member is done also from this oil sump. This allows the generation of dynamic pressure by the dynamic pressure generating grooves to be achieved more reliably.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinbelow, the present invention is described in detail by an embodiment thereof illustrated in the accompanying drawings.

Figure 1A:
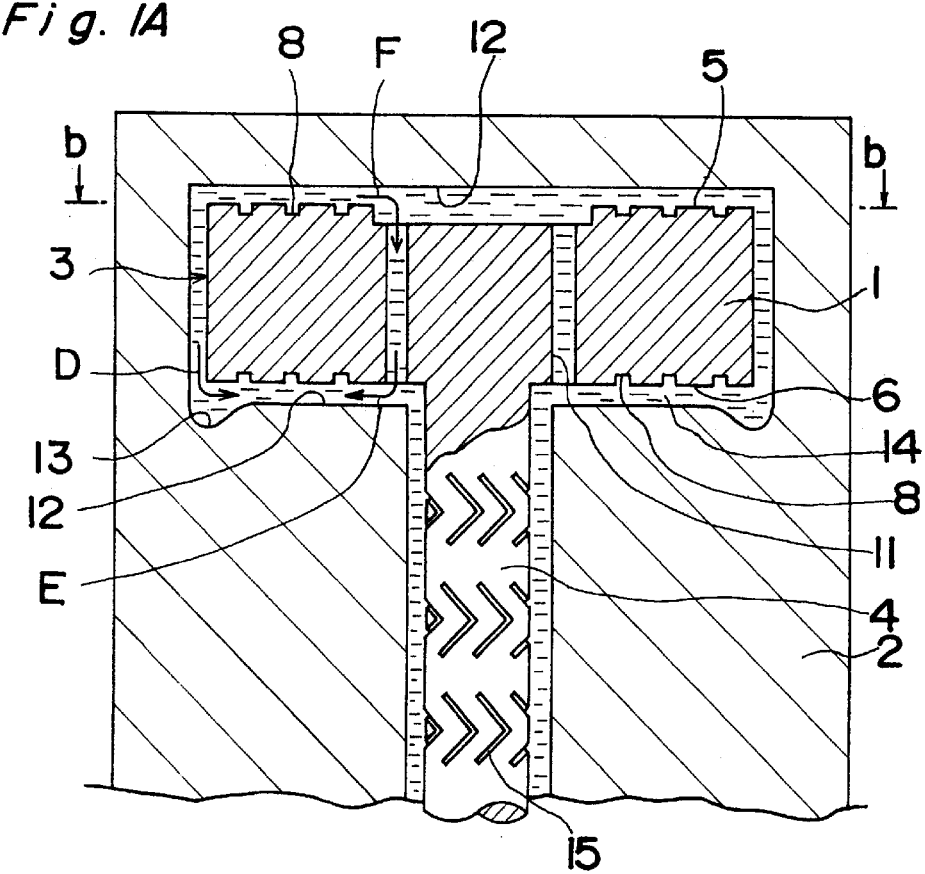
FIG. 1A is a sectional view of a dynamic pressure bearing according to an embodiment of the present invention.

FIG. 1A is a sectional view of an embodiment of the present invention.

Figure 1B:
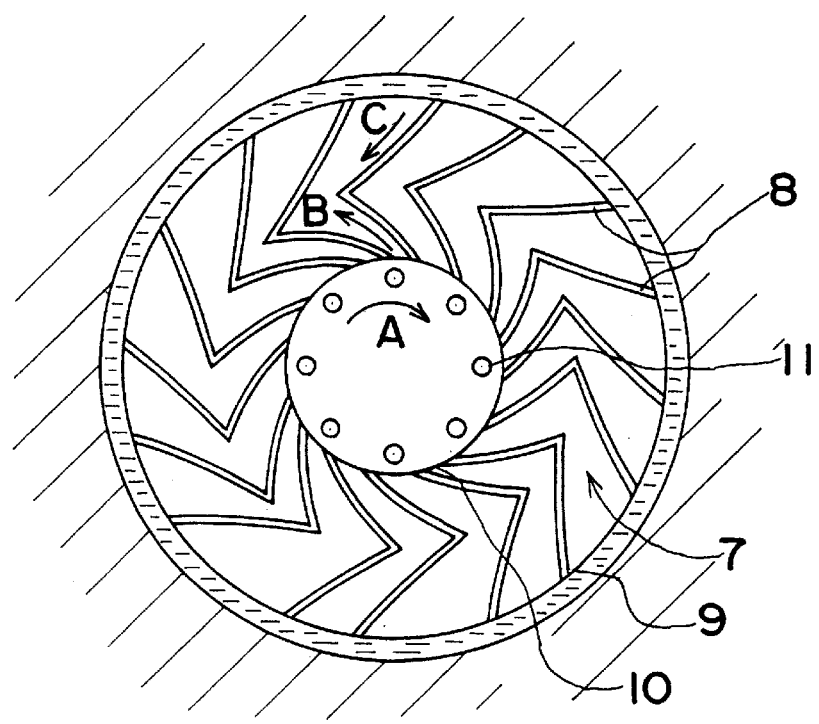
FIG. 1B is a plan view of the upper end face of a flange.

As shown in FIG. 1A, a rotating member 3 is comprised of a shaft body 4 and a flange 1 fixed to one end of shaft 4. The shaft body 4 and the flange 1 are supported radially and axially by the housing 2. The flange 1 is housed in the housing 2 in a closed state. At both upper and lower end faces 5, 6 of the flange 1, are provided V-shaped dynamic pressure generating grooves 8 in an annular region 7 as shown in FIGS. 1A, 1B. This annular region 7 is a region between a circle 9 and a circle 10 in FIG. 1B.

Radially inside the annular region 7 of the flange 1, eight through holes 11 are provided equidistantly on a circumference. The total sum of the cross-sectional areas of these through holes 11 is not less than 1/30 of the area of the annular region.

On the other hand, at a receiving surface 12 opposite to the lower end face 6 of the flange 1, are provided a plurality of oil sumps 13 partly opposed to the annular region 7. These oil sumps 13 are curved smoothly at their radial inside so that a working fluid 14 easily goes out toward the dynamic pressure generating grooves 8.

Meanwhile, dynamic pressure generating grooves 15 are provided on the shaft body 4 so that the shaft body 4 is radially supported by dynamic pressure as is apparent from FIG. 1A, each groove 15 is symmetrical with respect to a plane extending perpendicular to an axis of shaft body 4.

When the closed type thrust dynamic pressure bearing of the above construction has the rotating member 3 installed vertically, the flange 1 lowers due to its dead weight before start-up, so that the lower end face 6 of the flange 1 and the receiving surface 12 of the housing 2 opposite to the lower end face 6 of the flange 1 are brought into a contact state or into a state that only an extremely thin membrane of the working fluid 14 is present therebetween. In this state, with the rotating member 3 activated, the V-shaped dynamic pressure generating grooves 8 try to pull in the working fluid 14 toward a radial center of these grooves 8. When this occurs, a space formed between the upper end face 5 of the flange 1 and the receiving surface 12 of the housing 2 and a space formed between the lower end face 6 of the flange 1 and the receiving surface 12 of the housing 2 are communicated with each other by the holes 11 drilled through the flange 1 radially inside the annular region 7. Therefore, the working fluid 14 flows through the holes 11 as shown by arrows E, F in FIG. 1A so that the working fluid 14 is supplied to between the lower end face 6 of the flange 1 and the receiving surface 12 of the housing 2. As a result, even if the housing 2 has housed the flange 1 in a closed state, negative pressure is not generated between the upper end face 5 of the flange 1 and the housing 2. Thus, between the receiving surface 12 of the housing 2 and the lower end face 6 of the flange 1, the working fluid 14 can be sufficiently supplied particularly to radially inner portions as shown by arrows D, E, F so that dynamic pressure can be generated from the beginning of activation.

As shown above, when the rotating member 3 is started up, the working fluid 14 is sufficiently supplied to the annular region 7 of the lower end face 6 of the flange 1 so that enough dynamic pressure to axially support the flange 1 can be generated to the annular region 7 where the dynamic pressure generating grooves 8 are provided. Thus, the closed type thrust dynamic pressure bearing is enabled to fulfill the function as a thrust dynamic pressure bearing.

Also, the dynamic pressure generating grooves 8 of the flange 1 pull in the working fluid 14 from the oil sumps 13. That is, the dynamic pressure generating grooves 8 pull in the working fluid 14 from the oil sumps 13 located immediately under the dynamic pressure generating grooves 8 during the rotation of the flange 1. Therefore, the working fluid 14 is even more easily supplied to between the lower end face 6 of the flange 1 and the receiving surface 12 of the housing 2, as compared with the case where no oil sumps 13 are provided.

Figure 2:
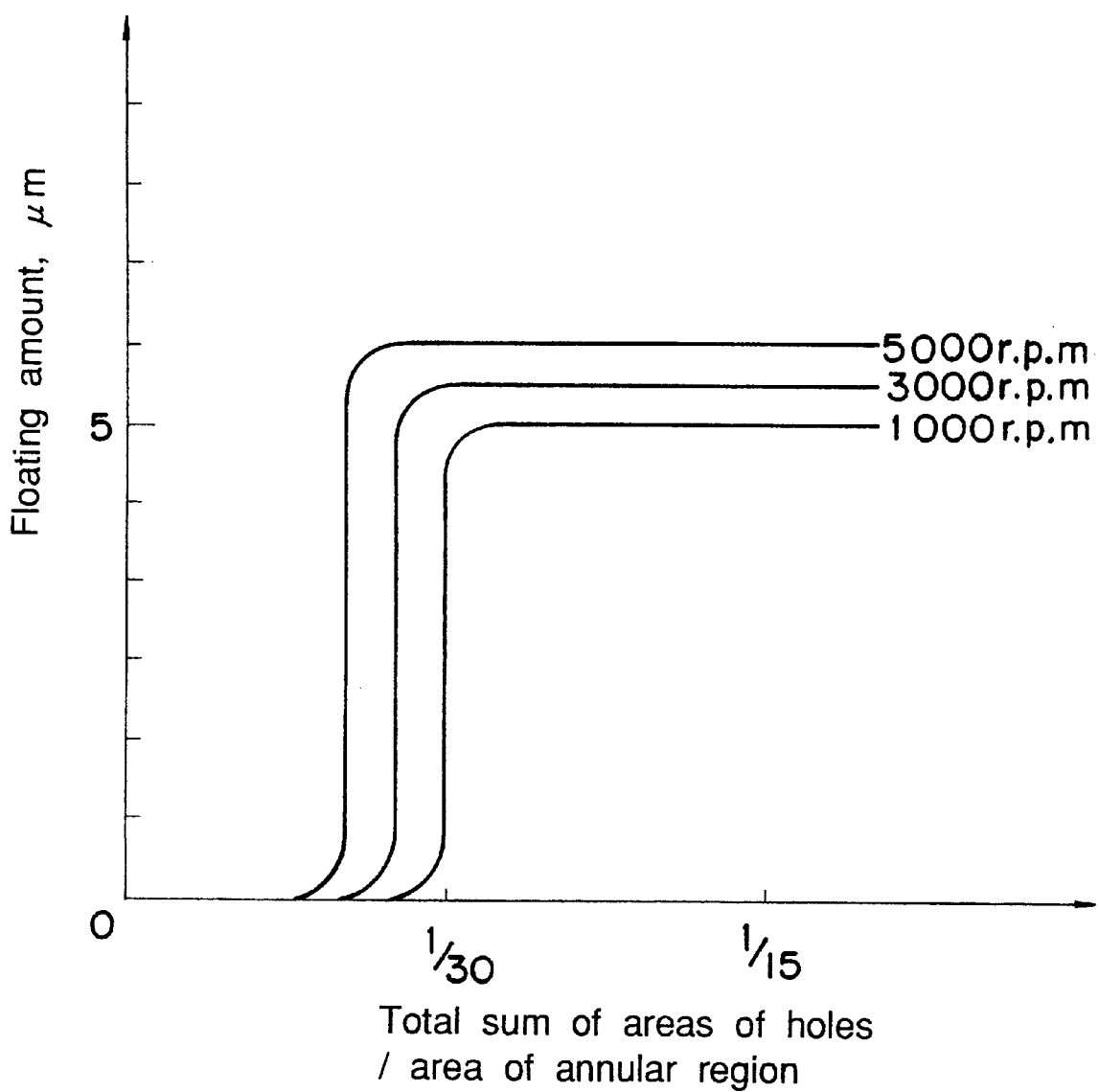
FIG. 2 is a graph showing an amount of floating of a rotating member versus the ratio of a total area of holes to an annular region.

FIG. 2 shows the relationship of an amount of floating of the rotating member 3 versus the ratio of the total area of all the holes 11 that allow the working fluid 14 to be circulated to the area of the annular region 7. More specifically, FIG. 2 is a graph showing the relationship of the amount of floating of the rotating member 3 versus the ratio of the total area of all the holes 11 for the working fluid 14 to the area of the annular region 7, in a case where the rotating speed of the rotating member 3 is varied to 1000 r.p.m., 3000 r.p.m. and 5000 r.p.m. Given a 1/30 or more ratio of the total area of the holes 11 to the area of the annular region 7, when the rotating speed of the rotating member 3 changes to 1000 r.p.m., 3000 r.p.m. and 5000 r.p.m., the amount of floating of the rotating member 3 becomes about 5 $\mu$m, 5.5 $\mu$m and 6 $\mu$m, being not less than a set amount of floating of 5 $\mu$m. Accordingly, if the ratio of the total area of the holes 11 for the working fluid 14 drilled through the flange 1 to the area of the annular region 7 is not less than 1/30 and if the rotating speed of the rotating member 3 is not less than 1000 r.p.m., then the rotating member 3 is enabled to ensure amount of floating not less than the set amount of floating of 5 $\mu$m.

Although the dynamic pressure generating grooves 8 are provided at the upper and lower end faces 5, 6 of the flange 1 in the above embodiment, the dynamic pressure generating grooves may alternatively be provided at the receiving surface of the housing opposite to the end faces.

Also, the oil sumps, although not shown, may also be provided at end faces of flange 1. These oil sumps may be opposed to the annular region where dynamic pressure generating grooves are provided, or partly overlapped with this annular region. Further, although plural oil sumps 13 are provided at an outer peripheral portion of the receiving surface 12 of the housing 2 in the illustrated an embodiment, they may also be provided at an inner peripheral portion of the receiving surface of the housing. The shape of the oil sumps may also be that of a round-hole, a circular-arc or a ring.

As is apparent from the foregoing description, the dynamic pressure bearing of the present invention comprises: a rotating member which comprises a shaft body and a flange provided at an end of the shaft body; and a housing for housing the flange of the rotating member in a closed state, wherein dynamic pressure generating grooves are formed at an end face of the flange or at a receiving surface of the housing opposite to the end face, characterized in that the flange has at least one hole which passes axially through the flange and which is provided radially inside an annular region where the dynamic pressure generating grooves are provided. Therefore, the working fluid can be sufficiently supplied to between the lower end face of the flange and the surface of the housing opposite to the lower end face of the flange, through the hole. Consequently, enough dynamic pressure to effect the axial bearing of the flange can be generated, allowing the thrust dynamic pressure bearing to fulfill the function as a thrust dynamic pressure bearing at start-up, and preventing the end face of the flange and the receiving surface of the housing being damaged.

Also, in the dynamic pressure bearing of the above embodiment of the invention, the total sum of cross-sectional areas of the hole or holes is at least 1/30 of the annular region. Therefore, the working fluid can be sufficiently supplied to between the lower end face of the flange and the receiving surface of the housing opposite thereto so that the set amount of floating can be ensured.

Also, in the dynamic pressure bearing of an embodiment of the invention, an oil sump is provided at the receiving surface of the housing or at the end face of the flange in such a way that the oil sump is at least partly opposed to or overlapped with the annular region. Therefore, the working fluid can be supplied more reliably to between the lower end face of the flange and the receiving surface of the housing opposite to thereto.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A closed thrust dynamic pressure bearing comprising:
    a rotating member including a shaft body and a flange provided at an end of said shaft body;
    a housing enclosing said flange in a closed state;
    one of an end face of said flange and a receiving surface of said housing opposite to said end face having dynamic pressure generating grooves arranged in an annular region; and
    said flange having extending therethrough at least one hole located radially inwardly of said annular region.

2. A bearing as claimed in claim 1, wherein said flange has extending therethrough plural holes.

3. A bearing as claimed in claim 2, wherein a total sum of cross-sectional areas of said holes is at least 1/30 of an area of said annular region.

4. A bearing as claimed in claim 1, wherein a total area of said at least one hole is at least 1/30 of an area of said annular region.

5. A bearing as claimed in claim 1, further comprising an oil sump provided at one of said end face and said receiving surface at a location at least partially opposed to or overlapped with said annular region.

6. A bearing as claimed in claim 1, further comprising herringbone-shaped dynamic pressure generating grooves formed on an outer peripheral surface of said shaft body, each said herringbone-shaped groove being symmetrical with respect to a plane extending perpendicular to an axis of said shaft body.

7. A bearing as claimed in claim 1, wherein said shaft body is free of radial bores therethrough.

8. A bearing as claimed in claim 1, wherein said flange has a second end face opposite said end face and facing away from said shaft body, said housing has another receiving surface confronting said second end face, and said another receiving surface is totally closed.

* * * * *